Figure 1:
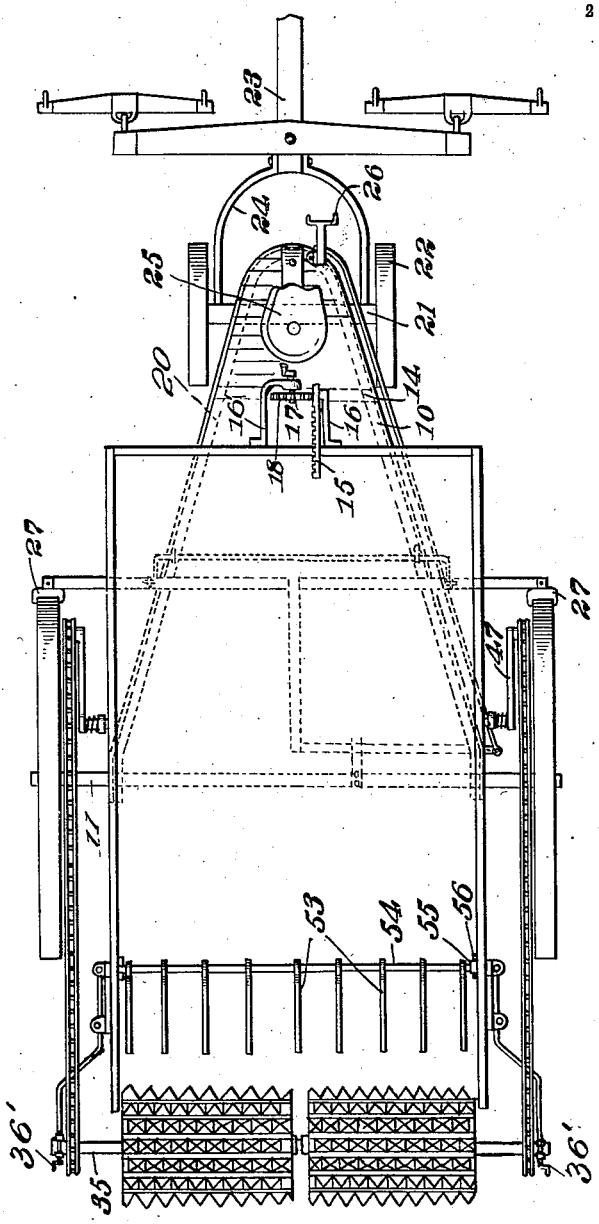

O. O. NEWBERRY.
FERTILIZER DISTRIBUTER.
APPLICATION FILED APR. 2, 1909.

951,216.

Patented Mar. 8, 1910.
2 SHEETS—SHEET 1.

Witnesses

Inventor
O. O. Newberry,
By
Lacey, Attorneys.

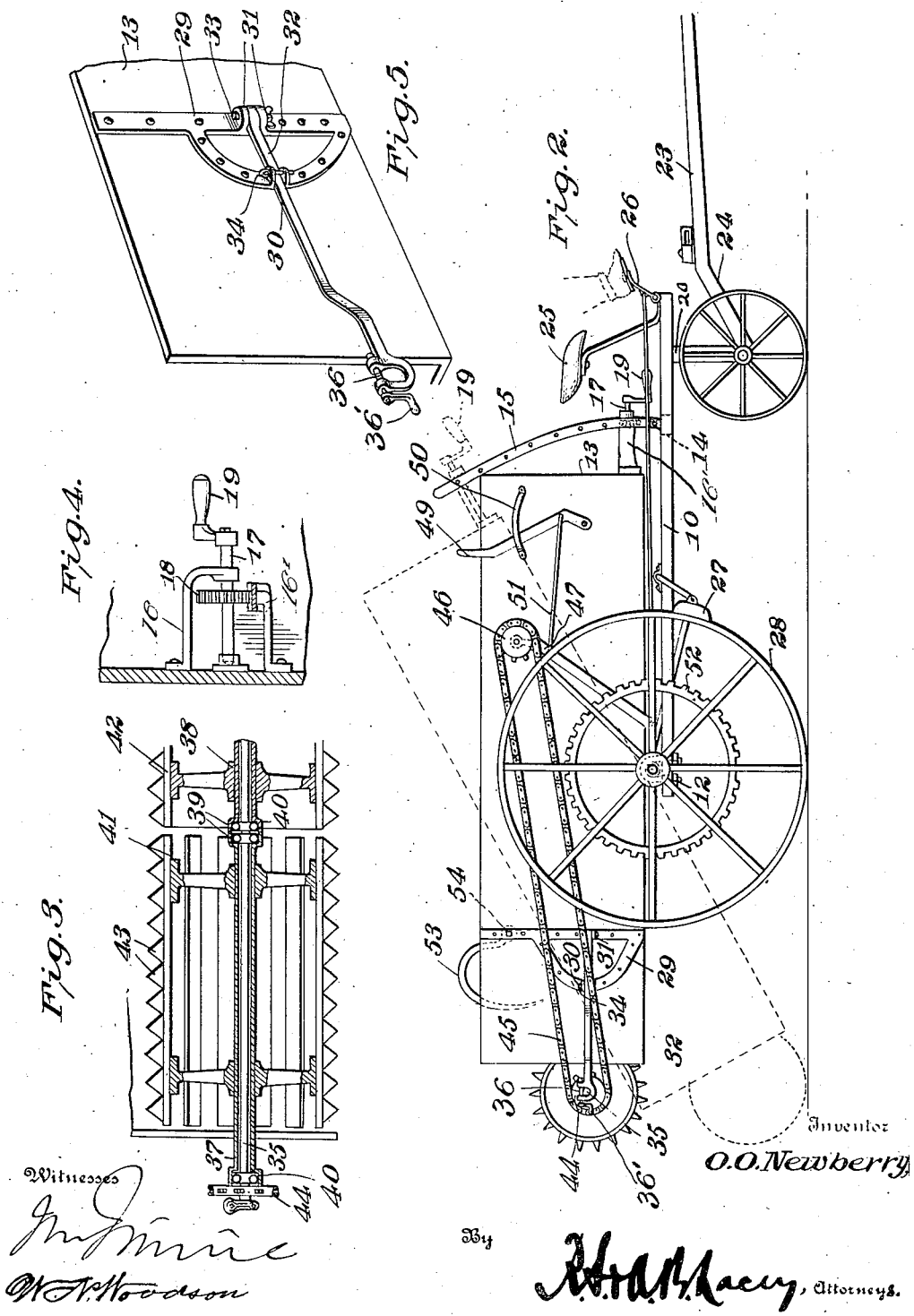

UNITED STATES PATENT OFFICE.

ORSON O. NEWBERRY, OF ARGYLE, IOWA.

FERTILIZER-DISTRIBUTER.

951,216.  Specification of Letters Patent.  Patented Mar. 8, 1910.

Application filed April 2, 1909. Serial No. 487,386.

*To all whom it may concern:*

Be it known that I, ORSON O. NEWBERRY, a citizen of the United States, residing at Argyle, in the county of Lee and State of Iowa, have invented certain new and useful Improvements in Fertilizer-Distributers, of which the following is a specification.

This invention relates to wagons and has special reference to a wagon to be employed in the distribution of fertilizers.

The object of this invention is the provision of a wagon which is provided with an attachment whereby the fertilizer may be distributed from the same, the attachment being detachably secured upon a wagon, so as to enable the operator to use the wagon for various other uses.

The invention has for a further object the provision of a wagon of this nature which is provided with means whereby the wagon box or body of the wagon may be tilted in order to feed the fertilizer rearwardly therein and also for the purpose of employing the wagon in the ordinary manner of dumping wagons.

The invention has for a still further object a novel construction of spreading cylinders and means for operating the same which may be quickly thrown out of operation when it is desired and which are so positioned upon the wagon body as not to interfere with the operation of the wagon when employed for other purposes.

For a full understanding of the invention and the merits thereof and also to acquire a knowledge of the details of construction and the means for effecting the result, reference is to be had to the following description and accompanying drawings, in which:

Figure 1 is a top plan view of the complete machine. Fig. 2 is a side elevation of the same. Fig. 3 is a detailed and enlarged fragmentary view of the spreading cylinders and supports for the same. Fig. 4 is a detailed and enlarged view of the means employed for tilting the wagon. Fig. 5 is a fragmentary perspective view of one side of the wagon body having the spreading cylinder supporting arm applied thereto.

Corresponding and like parts are referred to in the following description and indicated in all the views of the drawings by the same reference characters.

Referring to the drawings, the numeral 10 designates the main frame of the wagon, which is formed of an angle beam which is bent into U-form, having its outer extremities diverged and the same positioned in a substantially horizontal plane. The frame 10 is provided across the rear extremities of the same, which form the hounds of the wagon, with an axle 11 which is formed of metal to insure strength and durability. The axle 11 is provided intermediately thereon with a pair of strap hinges 12 which are disposed in spaced relation and which are secured to the bottom of the body 13 of the wagon for the purpose of hingedly supporting the same. The frame 10 is provided forwardly with a transverse beam 14 intermediately of which is pivotally secured a rack bar 15 which extends upwardly therefrom and is slidably engaged between a pair of forwardly extended ears 16 and 16′ carried upon the body 13 at the bottom thereof. The ear 16′ extends slightly beyond the forward edge of the rack bar 15 where it is curved inwardly and rotatably carries a stub shaft 17 upon which is disposed a pinion 18 meshed with the teeth upon the rack bar 15. The stub shaft 17 is provided with a crank arm 19 upon its outer extremity for the purpose of rotating the same. The ear 16 extends forwardly and engages the smooth surface of the rack bar 15 to slidably retain the same against the pinion 18.

The frame 10 is provided at its forward extremity with a transverse beam 20 against the under face of which, at the central point thereof, is pivotally disposed the central portion of an arched axle 21 which depends from the transverse beam 20 and supports upon its out-turned extremities wheels 22, which are adapted for rotation in a horizontal plane and to extend beneath the frame 10 upon the turning of the same. The axle 21 is provided in the usual manner with a tongue 23 and braces 24 for the purpose of drawing the wagon. The frame 10 is also provided at its forward end with a suitable seat 25 and a brake mechanism 26 for operating the brake shoes 27 which are adapted for engagement against the rear wheels 28 disposed upon the axle 11.

The fertilizer distributing attachment comprises two brackets 29 which are formed of sheet metal and which are preferably of D-formation having the arcuate portions extended rearwardly and provided intermediately thereof with outwardly extended lugs 30 which are disposed in parallel in a vertical plane. The straight portions of the brackets 29 are provided intermediately with raised portions 31 between which are pivotally disposed the forward extremities of arms 32 which are held in such pivotal engagement by means of pintles 33 positioned through the raised portions 31. The arms 32 extend rearwardly of the wagon body 13, as the brackets 29 are secured upon the opposite outer faces of the sides of the body 13 adjacent the rear ends thereof, and are adapted for engagement between the lugs 30 and held detachably in such engagement by means of pins 34 which are detachably positioned through the lugs 30. The rear extremities of the arms 32 are curved outwardly and extend beyond the ends of the sides of the body 13 where they are laterally forked to receive the extremities of a transversely disposed non-rotatable shaft 35 which is rigidly mounted therein. The shaft 35 is held in engagement with the arms 32 by means of pins 36 disposed through the ends of the fork in engagement with the flattened upper side at the ends of the shaft 35. A crank nut 36' is mounted upon the reduced end of the pin 36, which is threaded for the purpose of securing the pin 36 in position.

The rigid shaft 35 is provided intermediately with two sleeves 37 and 38 which are mounted at their opposite extremities upon bearings 39 which are carried in cones 40 disposed at the opposite ends of the shaft 35 and at the central point thereof. The sleeves 37 and 38 are of such length as to extend the entire length of the shaft 35 between the arms 32 and are supported at their inner adjoining ends upon the cone 40 which is provided with bearings 39 in the opposite sides thereof. The sleeves 37 and 38 are provided with drums 41 and 42 which extend the entire length of the same and which are provided upon their peripheries with radially extended teeth 43.

The means employed for actuating the drums 41 and 42 comprise sprockets 44 which are mounted upon the opposite outer ends of the sleeves 37 and 38 which are adapted for the reception of chains 45 which extend forwardly therefrom upon the outside of the body 13 and are engaged over sprockets 46 which are mounted upon arms 47 carried at the intermediate portion of the body 13. The arms 47 are extended downwardly from the sprockets 46 where they are rigidly engaged upon the opposite extremities of a shaft 48 transversely and rotatably disposed beneath the body 13 for the purpose of communicating motions between the same.

At one side of the body 13 a hand lever 49 is positioned which is fulcrumed at its lower extremity and which extends upwardly a slight distance beyond the upper edge of the adjoining side and is provided with a segment 50 of common formation for the purpose of securing the hand lever 49 in various angles. The hand lever 49 is connected intermediately of the adjacent arm 47 through the medium of a link 51 which is employed for the purpose of imparting angular movement of the arms 47 in order to raise or lower the sprockets 46 and the chains 45 to engage the same upon the teeth of gears 52 which are rigidly carried upon the inner faces of the wheels 28.

For the purpose of preventing the displacement of large quantities of the fertilizer by the rotation of the cylinders 41 and 42 the body 13 is provided with a plurality of tines 53 which are curved backwardly and downwardly from a transverse bar 54 to form a rake for the purpose of separating the fertilizer, as the same is raised upwardly and outwardly by the rotation of the drums 41 and 42. The bar 54 is disposed upon blocks 55 at its opposite extremities which are mounted between guides 56 disposed vertically in parallel upon an opposite inner face of the body 13 to admit of the displacement of the bar 54 when it is desired to detach the fertilizer distributing device.

The operation of the device is as follows: When the fertilizer distributing attachment is to be positioned upon the wagon the operator rotates the stub shaft 17 by means of the crank arm 19 to raise the forward extremity of the body 13 upon the rack bar 15. When in this position the arms 32 are positioned adjacent the ground and the cylinders 41 and 42 are rolled into engagement with the rear end of the wagon body 13 when the arms 32 are extended below the outer extremities of the rigid shaft 35 and the tapered pins 36 are then positioned and the crank nuts 36' are placed over the ends of the same. The pins 34 are now inserted through the lugs 30 to further strengthen and secure the arms 32 in position. The chains 45 are now positioned over the sprockets 44 and 46, when the device is ready for use. The tines 53 which form a rake are now positioned, if it is desired, within the wagon body 13 and serve to separate the fertilizer as it is fed from the wagon body 13. The wagon body 13 is preferably maintained in the tilted position for the purpose of feeding the fertilizer rearwardly therein and is held in such position by any suitable and well known locking means at present employed in connection with dumping wagons, as for instance, to secure a pin through the forwardly extended ears 16 and through the rack 14 engaged therebetween. When it is desired to throw the distributing apparatus into operation the lever 49 is swung forwardly to throw the arms 47 forwardly and downwardly, thereby carrying the sprockets 46 therewith and dropping the chains 45 into engagement with the teeth of the gears 52, thereby causing the actuation of the chains 45 to operate the cylinders 41 and 42. By this arrangement it is readily seen that when the wagon is turned, that is when one of the wheels 52 is brought into substantially stationary position, the cylinder which is connected in operative relation thereto will also be prevented from rotation and the fertilizer will not be distributed from that side of the wagon, thereby preventing accumulation of the same upon the turning of the wagon. This is an improved feature and produces a device which is of great practical advantage in distributing fertilizer. In detaching the cylinders 41 and 42 from the wagon body 13 the body is again tilted to bring the cylinders into engagement with the ground when the binding nuts 36 are removed from the extremities of the shaft 35, and, after releasing the pins 34 from the lugs 30, the arms 32 are swung outwardly when the cylinders are permitted to be rolled backwardly from the wagon and thereby detached from the same. The chains 45 may be readily detached from the sprockets 44 and 46 upon the release of the arms 32, to permit of the inward movement of the shaft 35 to enable the withdrawal of the same.

Having thus described the invention what is claimed as new is:

1. A device as specified comprising a frame, wheels carried by the said frame for supporting the same, a body pivotally disposed at the rear end of said frame, a rack bar pivotally mounted on said frame and upwardly extended from the forward end thereof, ears forwardly projected from said body upon the opposite sides of said rack bar, a pinion carried by one of said ears for engagement with said rack bar for raising the forward end of said body the opposite of said ears slidably engaged against said rack bar to retain the same against said pinion, a pair of cylinders independently mounted at the rear of said body, and means carried by said body and connected to said cylinders for independently actuating the same by the rotation of the drive wheels of said frame.

2. A device as specified comprising a frame, an axle rigidly positioned at the rear end of said frame, drive wheels disposed upon said axle, an axle mounted on the forward end of said frame, wheels disposed on said axle, a body hingedly disposed upon said frame, cylinders rotatably and independently mounted at the rear end of said body, sprockets carried by said cylinders at the outer ends thereof, sprockets carried by said body at the forward end thereof adapted for vertical adjustment thereon, chains disposed over said sprockets on said cylinders and on said sprockets on said body, and gears carried upon the inner faces of said drive wheels adapted for engagement at times with said chains.

3. In a device as specified the combination of a wagon frame, a tilting body disposed on said frame, a shaft detachably and transversely positioned across the rear extremity of said body, cylinders disposed independently and rotatably upon said transverse shaft, sprockets carried by said cylinders at the outer ends thereof, sprockets disposed upon the outer opposite faces of said body and adapted for vertical adjustment relative thereto, chains disposed over said sprockets on said cylinders and said sprockets carried by said body, and means carried by said wagon frame for engagement with said chains to actuate the same.

In testimony whereof I affix my signature in presence of two witnesses.

ORSON O. NEWBERRY. [L. S.]

Witnesses:
FRANK D. CARR,
BERTHA A. O'NEILL.